United States Patent
Stephens

(10) Patent No.: US 6,968,339 B1
(45) Date of Patent: Nov. 22, 2005

(54) SYSTEM AND METHOD FOR SELECTING DATA TO BE CORRECTED

(75) Inventor: Robert Todd Stephens, Sharpsburg, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 556 days.

(21) Appl. No.: 10/225,112

(22) Filed: Aug. 20, 2002

(51) Int. Cl.$^7$ .............................................. G06F 17/30

(52) U.S. Cl. .......................... 707/101; 707/6; 707/7; 702/179; 702/181; 708/200; 708/250

(58) Field of Search ..................... 707/6–7, 100–101; 702/179, 181; 708/200, 250

(56) References Cited

U.S. PATENT DOCUMENTS

| | | | |
|---|---|---|---|
| 5,799,302 A * | 8/1998 | Johnson et al. ................ | 707/7 |
| 6,026,398 A * | 2/2000 | Brown et al. .................. | 707/5 |
| 6,408,271 B1 * | 6/2002 | Smith et al. ................. | 704/257 |
| 6,457,012 B1 * | 9/2002 | Jatkowski ................... | 707/101 |

OTHER PUBLICATIONS

Sebastiani et al., "Profiling your Customers Using Bayesian Networks", ACM SIGKDD Explorations Newsletter, vol. 1, Issue 2 (Jan. 2000) pp.: 91-96.*

Chays et al., "A Framework for Testing Database Applications", ACM SIGSOFT Software Engineering Notes, Proceedings of the 2000 ACM SIGSOFT international symposium on Software testing and analysis, vol. 25 Issue 5, Aug. 2000.*

* cited by examiner

Primary Examiner—Luke S. Wassum
Assistant Examiner—Khanh Pham
(74) Attorney, Agent, or Firm—Woodcock Washburn LLP

(57) ABSTRACT

A pool of data elements is identified. A set of random data elements is selected from the pool. The data elements in the set are scored. Data elements may be scored based on attributes of the data such as, for example, the type of the data, the domain of the data; the structure of the data; the size of the data, and the volume of the data. The lowest scoring data elements are removed from the set. The lowest scoring data elements are replaced by data elements from the pool that are related to the highest scoring data elements in the set. The set is scored. It is determined whether the current set score is within a predetermined desired range of the previous set score. If the current set score is not within a predetermined desired range of the previous set score, then the process is repeated.

20 Claims, 4 Drawing Sheets

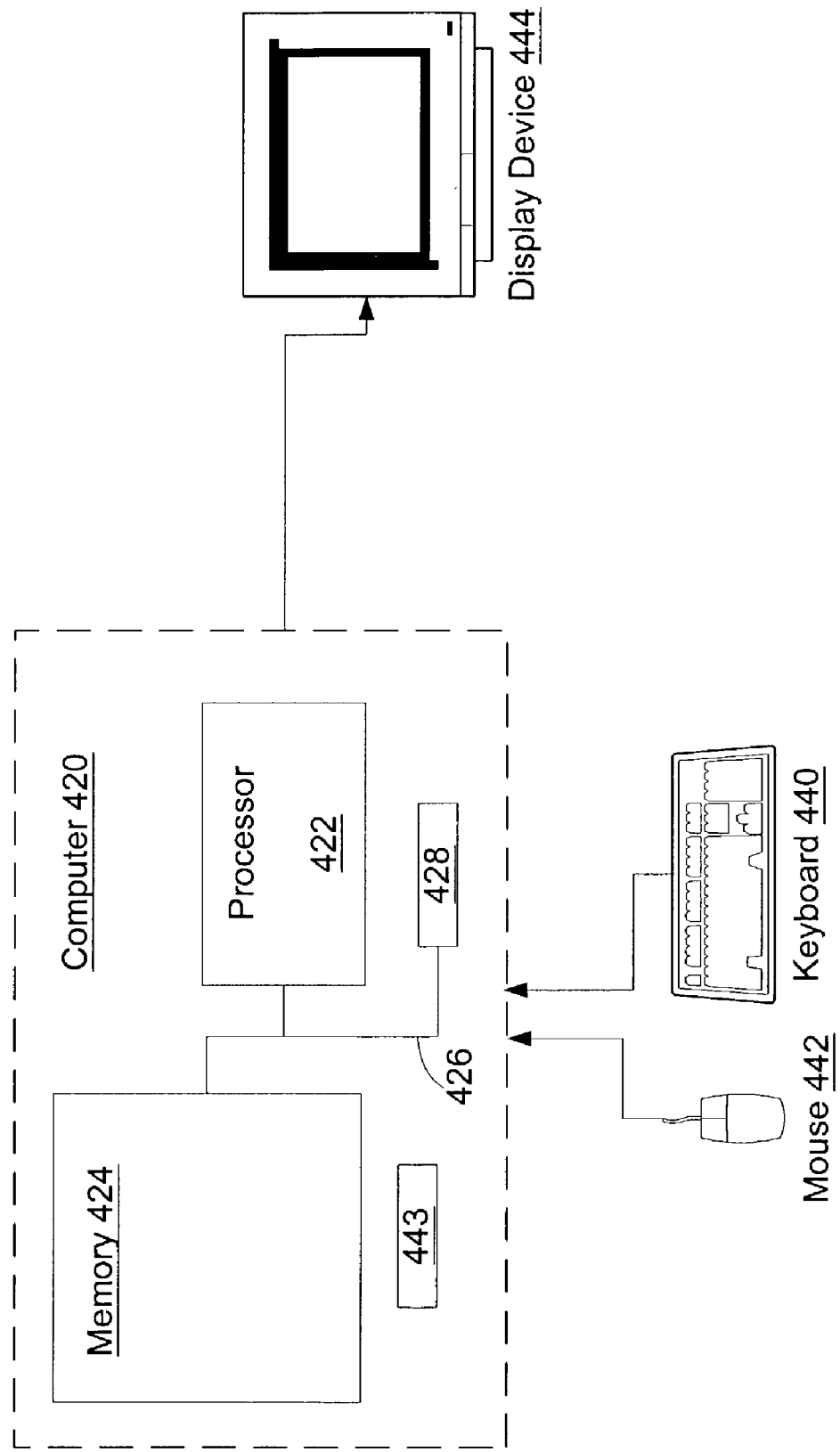

SYSTEM AND METHOD FOR SELECTING DATA TO BE CORRECTED

BACKGROUND OF THE INVENTION

1. Field of the Invention

The present invention relates to the field of data management, and, more specifically, to selecting data to be corrected.

2. Description of the Prior Art

Incorrect data is a frequent and costly problem within modern data architecture. As the quantity of data that is processed and stored increases at an exponential rate, incorrect data quality will to continue to become increasingly problematic. Incorrect data may result in tremendous profit losses for providers of goods and services. For example, if a mail order catalog provider has incorrect records of consumer addresses, the catalog provider will be unable to reach its target consumers. Incorrect data may be caused by such factors as duplicate data, non-standardized data, and data decay. For example, data corresponding to consumer addresses may be incorrect due to an error in transcribing the data. Furthermore, even if the data was transcribed correctly, because many consumers change address without notifying goods and services providers, such address data is often outdated.

Incorrect data often requires a great deal of time and expense to correct. One reason for this high cost is that data is rarely used by those who are able to both recognize incorrect data and provide necessary feedback to correct the data. For example, address data may be used by a marketing department to create a demographic profile of consumers. However, it is consumers, rather than the marketing department, that are most able to recognize incorrect address data and provide the necessary feedback to correct the data. Unfortunately, such consumers are only likely to view their address data if such data is correct and correspondence is sent to a correct address.

Another reason for the high cost of data correction is that data correction often requires multiple steps to identify incorrect data and to obtain feedback to correct such data. For example, to correct address data, an initial contact must be attempted to determine if the address is correct. This initial contact may often involve several attempts, as many consumers may not readily respond to correspondence sent to a correct address. Furthermore, a secondary contact is often required to obtain feedback to correct the data.

Due to the high cost of data correction, it is generally not feasible to correct a large volume of data in its entirety. Rather, when dealing with a large volume of data, it is generally cost effective to select a portion of the data to correct. Typically, it is most cost effective to select data for correction that is low quality and has a low correction cost. However, a determination of data quality and correction costs may often be inaccurate because it is based on anecdotal evidence rather than on actual error statistics. Specifically, a data steward or manager may determine that a portion of data is particularly low in quality if he or she has personally experienced or been notified of a large number of specific errors within the portion. Such errors may not be representative of the overall quality of the data. Furthermore, even if determinations of data quality and correction costs are accurate, tremendous costs may already be incurred before a portion of data is determined to be particularly problematic.

Such error costs may be eliminated by pre-determining which portions of data are likely to cause errors before such errors actually occur. Such a pre-determination may be made based on data attributes such as, for example, the type, domain, structure, size and volume of the data. Thus, there is a need in the art for systems and methods for selecting data to be corrected.

SUMMARY OF THE INVENTION

Accordingly, systems and methods for selecting data to be corrected is disclosed. A pool of data elements is identified. Each data element may be recoded in a metadata repository using an identifier. A set of random data elements is selected from the pool. The data elements may be randomly selected by assigning each element an identification number. A set of identification numbers may then be selected using a random number generator.

The data elements in the set are scored. Data elements may be scored based on attributes of the data such as, for example, the type of the data, the domain of the data; the structure of the data; the size of the data, and the volume of the data. Such data attributes may be used to estimate relative data quality and correction costs.

The lowest scoring data elements are removed from the set. The lowest scoring data elements are replaced by data elements from the pool that are related to the highest scoring data elements in the set. Data elements from the pool may be related to data elements in the set based on relationships such as, for example, logical relationships, physical relationships, data transformations, naming standard relationships. A logical relationship may be a relationship between an entity and an attribute.

The set is scored. The score of the set may be the cumulative score of each element in the set. It is determined whether the current set score is within a predetermined desired range of the previous set score. If the current set score is not within the predetermined desired range of the previous set score, then the process is repeated until the current set score is within the predetermined desired range. If the current set score is within the predetermined desired range, then the data is identified as data to be corrected.

BRIEF DESCRIPTION OF THE DRAWINGS

The present invention will be better understood after reading the following detailed description of the presently preferred embodiments thereof with reference to the appended drawings, in which:

FIG. 4 is a high level diagram of an exemplary computer network for for use with the present invention.

DETAILED DESCRIPTION

Figure 1:
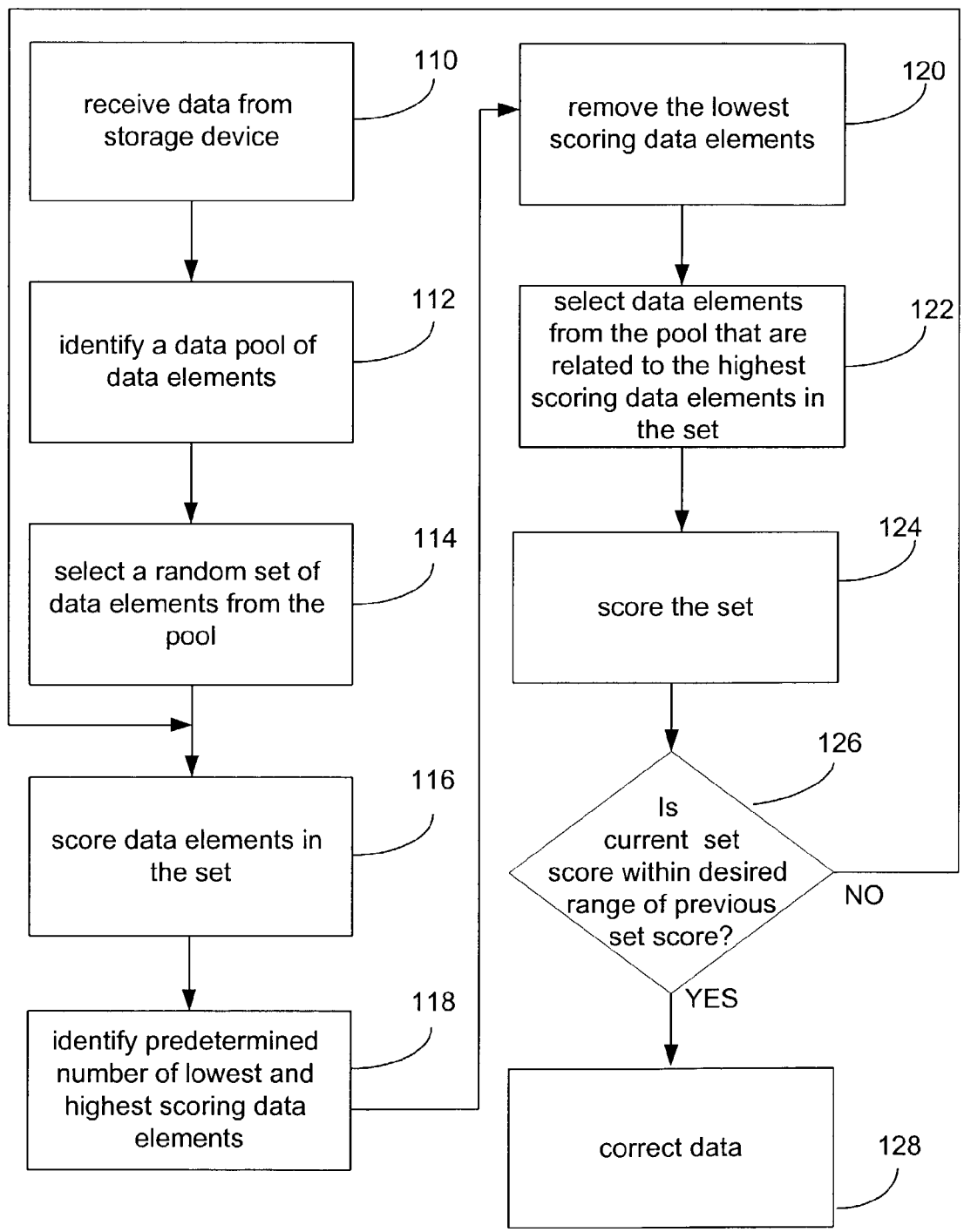
FIG. 1 is a flowchart of an exemplary method for selecting data to be corrected in accordance with an aspect of the present invention.

A system that meets the above-mentioned objects and provides other beneficial features in accordance with the presently preferred exemplary embodiment of the invention will be described below with reference to aforementioned Figures. Those skilled in the art will readily appreciate that the description given herein with respect to those figures is for explanatory purposes only and is not intended in any way to limit the scope of the invention. Throughout the description, like reference numerals will refer to like elements in the respective figures.

FIG. 1 is a flowchart of an exemplary method for selecting data to be corrected in accordance with an aspect of the present invention. Generally, a pool of data elements is identified from data residing in a storage device, such as a computer memory or database, for example. The data had been previously generated, compiled, or otherwise received, and stored in the storage device. A random set of elements is selected from the data pool. Each element in the random set is scored. A subset of the lowest scored elements is removed from the set. A subset of elements from the pool that are related to a subset of the highest scored elements is added to the set. The set is scored, and it is determined whether the current set score is within a predetermined desired range of the previous set score. The process is repeated until the current set score is within the desired range of the previous set score.

In particular, as shown, at step 110, data is received from a storage device such as, for example, a computer memory or database. At step 112, a pool of data elements is identified. The data pool may be identified using a metadata repository. Each data element may be identified within the repository by a numerical identifier. The numerical identifier may be used to locate the element from a Uniform Resource Link (URL) or a program object, for example.

At step 114, a random set of data elements is selected from the pool. The numerical identifiers may be placed in numerical order and input to a random number generator. The random number generator ensures that each element is only selected once and that each element has the same chance of being selected.

At step 116, each data element in the randomly selected set is scored. The score may be based on factors such as data quality and correction costs. Typically, data with the lowest quality and the lowest correction cost is the most beneficial to correct, and, therefore, may be scored highest. Alternatively, data with the highest quality and the highest correction cost is the least beneficial to correct, and, therefore, may be scored lowest. Data attributes such as, for example but not limited to, the type of the data, the domain of the data, the structure of the data, the size of the data, and the volume of the data may be used to determine data quality and correction costs as set forth below.

The data type is a set of data with values having predefined attributes such as, for example, integers, dates, times, floating-point unit numbers, characters, strings, and pointers. Generally, a limited number of data types are pre-defined in a programming language. The language typically specifies the range of values for a particular data type, how the values are processed, and how the values are stored. Data with a type having a large range of values is generally both more likely to be lower quality and have higher correction costs. Data with a type having a small range of values is generally both more likely to be higher quality and have lower correction costs.

The domain of the data is an abstraction of valid values. For a logical field, the domain of the data is 0 to 1. For numeric data, the domain may be 0 to 999 for a non-signed 3-byte field. The domain may be limited based on a particular application. Specifically, for the 3-byte field used in a days of the year application, the field may be limited from 999 to 365. The domain of the data may be explicitly defined as an application or "business rule" for the data. Data with a domain having a larger range of values is generally both more likely to be lower quality and have higher correction costs. Data with a domain with a having a smaller range of values is generally both more likely to be higher quality and have lower correction costs.

The structure of the data is another factor in scoring the data. A social security field may have the structure 999-99-9999, with 9's representing valid numerical values. Data with a complex structure is generally both more likely to be lower quality and have higher correction costs. Data with a simple structure is generally both more likely to be higher quality and have lower correction costs.

The size of the data is another factor in scoring the data. A data field with a larger size will generally have a larger domain of valid values. Data with a larger size is generally both more likely to be lower quality and have higher correction costs. Data with a smaller size is generally both more likely to be higher quality and have lower correction costs.

The volume of the data is another factor in scoring the data. The volume of the data is the number of records of the data element. Data with a larger volume is generally both more likely to be lower quality and have higher correction costs. Data with a smaller volume is generally both more likely to be higher quality and have lower correction costs.

Computer programs may be used to determine data attributes such as the type, domain, and field of the data by sampling the population structure of the data. For example, suppose the valid values of a 1-byte field are unknown. However, if a program is run over the entire data collection or sample of the data and 99% of the values of the field are "Y" and "N", it may be determined that the data has only two valid values. All other values may be assumed to be invalid unless specifically stated otherwise in the metadata repository.

Any technique may be used to score a data element based on any or all of the attributes set forth above. For example, the score of a data element may be a linear or exponential relationship to any or all of the attributes set forth above. The scoring technique may be based on the observed impact or a predicted impact of each attribute on factors such as data quality and cost of correction. As should be appreciated, additional factors may also be used to score data.

At step 118, a predetermined number of lowest and highest scoring data elements are identified. As set forth above, data with the lowest quality and the lowest correction cost is typically the most beneficial to correct, and, therefore, may be scored highest. Alternatively, data with the highest quality and the highest correction cost is the least beneficial to correct, and, therefore, may be scored lowest. Data attributes such as, for example but not limited to, the type of the data, the domain of the data, the structure of the data, the size of the data, and the volume of the data may be used to determine data quality and correction costs as set forth above.

At step 120, the predetermined number of lowest scoring data elements are removed from the set. At step 122, the lowest scoring data elements are replaced with data elements from the pool that are determined to be related to the highest scoring data elements in the set. Elements in the pool may be related to attributes in the set based on parent and child relationships. Parent and child relationships may be located using relationships such as logical relationships, physical relationships, data transformation relationships, and naming standards, for example.

Figure 2:
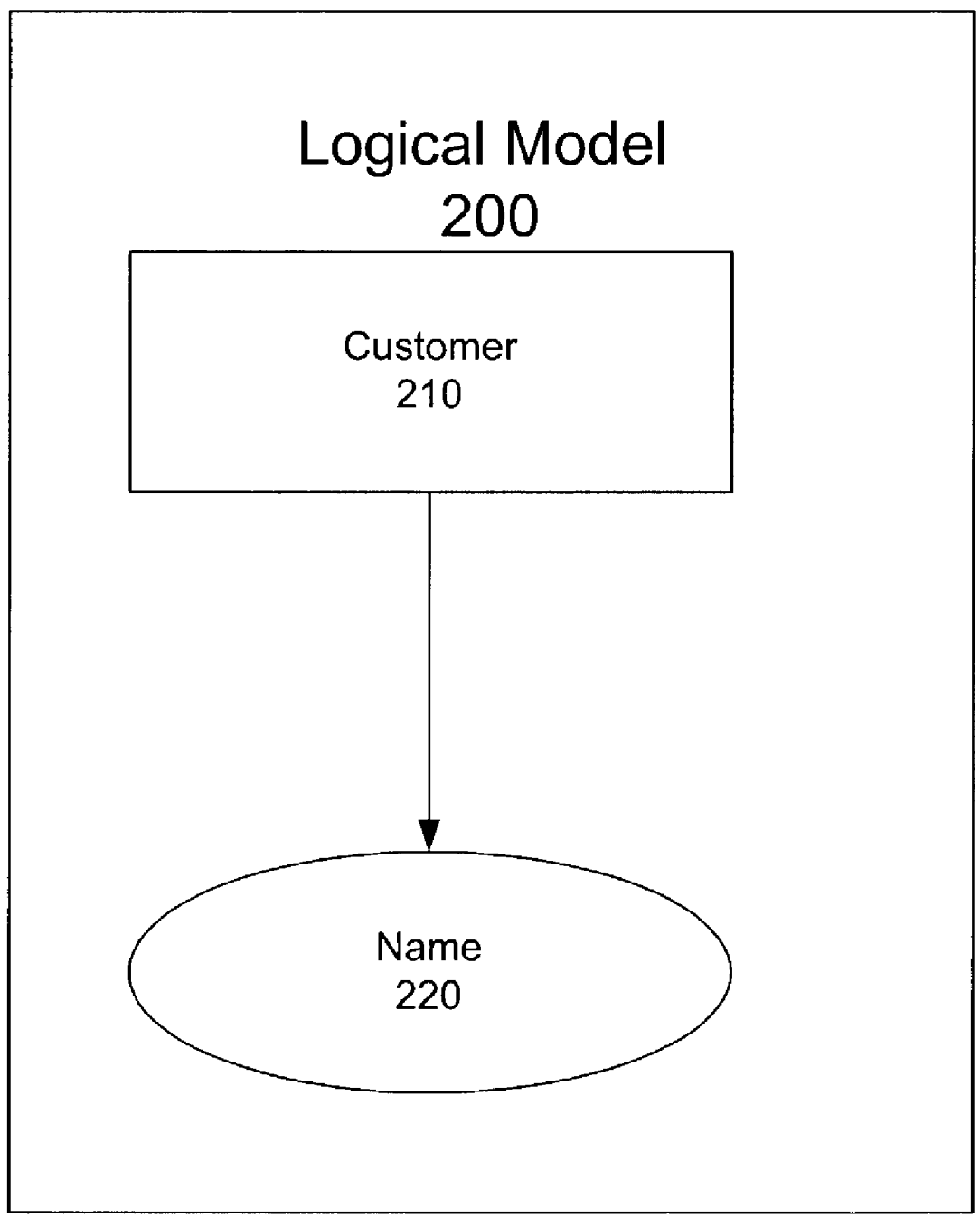
FIG. 2 is a model of an exemplary logical relationship between an entity and an attribute in accordance with the present invention.

A logical relationship may be expressed as a relationship between an entity and an attribute. An entity is an object or concept that is uniquely defined. Two types of entities may be defined, for example. A weak entity is an entity that is dependent on other entities. Alternatively, a strong entity is not dependent on any other entity. Entities may be constructed with properties that describe the entity in more detail. Such properties may be referred to as attributes. A model of an exemplary logical relationship is shown in FIG. 2. As shown, logical model 200 includes "customer" entity 210 with "name" attribute 220.

The logical relationship model is provable in the mathematics of data science. Given the current predominance of relational databases, logical models generally conform to relational theory. Thus, a logical model desirably includes only fully normalized entities, which may represent logical domains rather than potential physical tables. For a logical data model to be normalized, it preferably includes the full population of attributes to be implemented. Such attributes are desirably defined in terms of their domains or logical data types such as, for example, character, number, date, and picture.

A logical data model desirably uses a complete scheme of identifiers or candidate keys for unique identification of each occurrence in every entity. Since there are choices of identifiers for many entities, the logical model indicates the current selection of identity. Propagation of identifiers as foreign keys may be explicit or implicit. Since relational storage typically cannot support many-to-many concepts, a logical data model resolves many-to-many relationships into associative entities, which may acquire independent identifiers and possibly other attributes as well. The entity and attribute relationship enables the selection of the top valued data elements and the location of other entities or attributes that are related by the use of the logical model. The logical relationship may be captured in the metadata repository.

Figure 3:
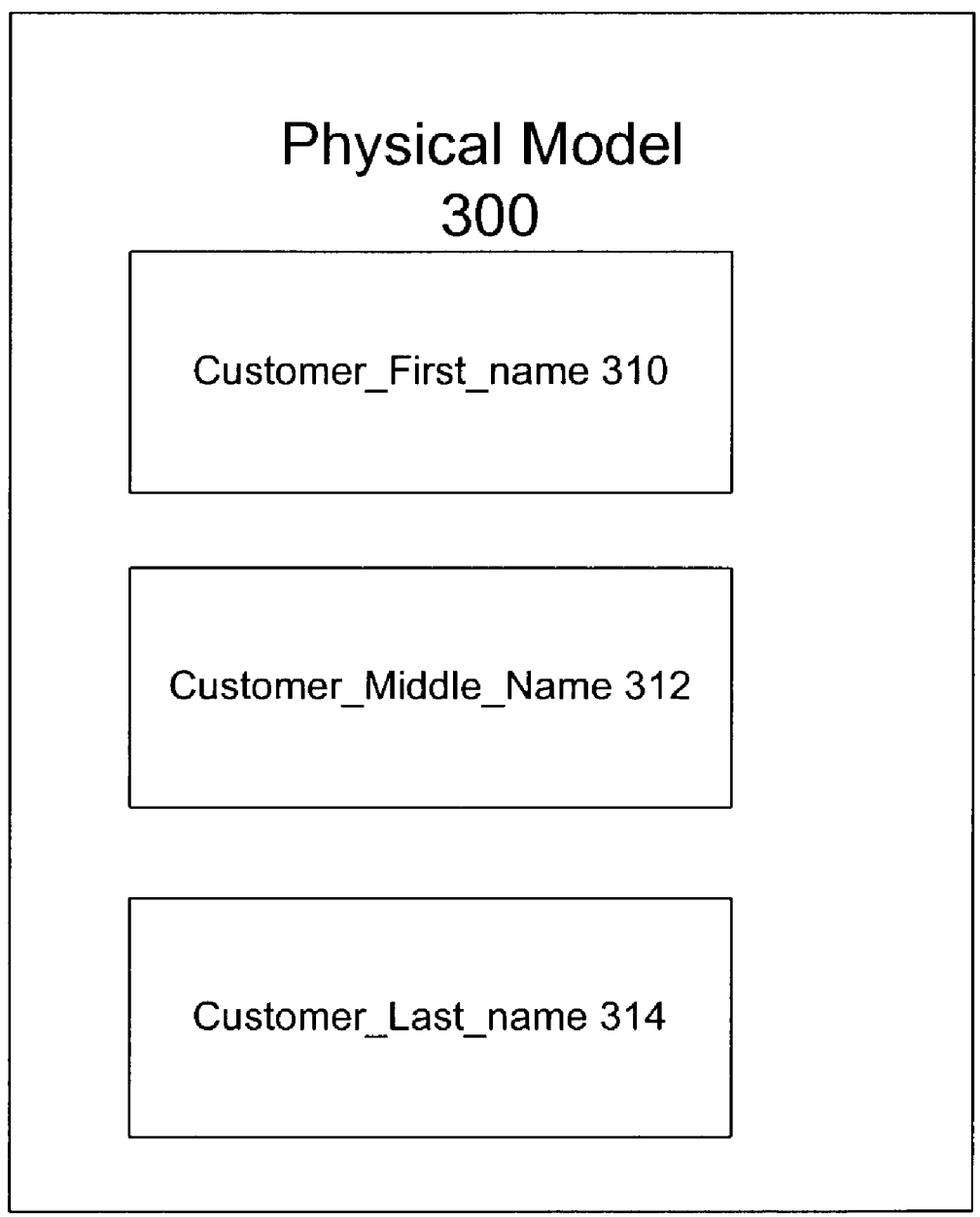
FIG. 3 is a model of an exemplary physical relationship corresponding to a logical model in accordance with the present invention.

A physical data model is a single logical model instantiated in a specific database management product in a specific installation. An exemplary physical relationship corresponding to logical model 200 of FIG. 2 is shown in FIG. 3. As shown, physical model 300 includes "Customer_First_Name" element 310, "Customer_Last_Name" element 312, and "Customer_Middle_Name" element 314.

The physical data model specifies implementation details, which may be features of a particular product or version. The physical data model also specifies configuration choices for the particular database instance such as, for example, index construction, alternate key declarations, modes of referential integrity, constraints, views, and physical storage objects such as tablespaces. As with the logical relationship set forth above, the physical relationship may occur within the same table or database. Thus, such relationships are defined by the particular data element and the physical traits of the data.

Data transformations may also be used to locate parent and child relationships. Within the metadata repository, data transformations are captured in the form of mapping templates. A particular data element may be loaded from another data element within the pool. As data moves around the pool, the data changes in value and construct.

Additionally, naming standards may be used to locate parent and child relationships. As set forth above, an entity is an object or concept that is uniquely defined, and entities may be constructed with attributes that describe the entity in more detail. In addition to the entity and attribute elements, sub-elements may be required due to the fact that logical and physical models may be combined. For example, when physical model 300 is combined with logical model 200, "First name", "Last Name", and "Middle Name" sub-attributes are used. Data element "Customer_First_Name" 310 may be accordingly broken down into three distinct tokens. The "Customer" token will represent the entity, while the "Name" token represents the attribute. The "First" token is an additional element that adds meaning to the field name. Therefore, this token is identified as a sub-attribute based on the relationship to the "Name" attribute.

Entities should preferably provide only a single descriptor or function based on the terms used. Adding sub-elements provides additional understanding of the data element, and, therefore, does not remove the validity of the mapping process.

At step 124, the set is scored. The set score may be the cumulative score of each element. At step 126, it is determined whether the current set score is within a predetermined desired range of the previous set score. The desired range may be small enough so as to have no appreciable effect on the set. If the current set score is not within a predetermined desired range of the previous set score, then the process is repeated.

If the current set score is within a predetermined desired range of the previous set score, then, at step 128, the data within the current set may be corrected. The data selected for correction at step 128 will desirably have the lowest quality and the lowest correction cost, and, therefore, will likely be the most beneficial to correct.

Those skilled in the art understand that computer readable instructions for implementing the above-described processes, such as those described with reference to FIG. 1, may be generated and stored on one of a plurality of computer readable media such as a magnetic disk or CD-ROM. Further, a computer may be arranged with other similarly equipped computers in a network and loaded with computer readable instructions for performing the above described processes.

FIG. 4 is a block diagram of a generic computing system suitable for use in a system in accordance with the present invention. As shown, computing device 420 includes processing unit 422, system memory 424, and system bus 426 that couples various system components including system memory 424 to the processing unit 422. The system memory 424 might include read-only memory (ROM) and random access memory (RAM). The system might further include hard-drive 428, which provides storage for computer readable instructions, data structures, program modules and other data. A user may enter commands and information into the computer 420 through input devices such as a keyboard 440 and pointing device 442 which may be, for example, a mouse or remote control. A monitor 444 or other type of display device is also connected to the system for output. Communications device 443, which in one embodiment may be a modem, provides for communications over a network such as, for example, the Internet. Processor 422 can be programmed with instructions to interact with other computing systems so as to perform the techniques described above with reference to FIG. 1. The instructions may be received from a network or stored in memory 424 and/or hard drive 428. Processor 422 may be loaded with any one of several computer operating systems such as Windows NT, Windows 2000, or Linux.

Thus, a system and method for selecting a set of data with desired attributes has been disclosed. The method may be used to select data that is most beneficial to correct. The method selects data based on attributes of the data such as, for example, the type, domain, structure, size, and volume of the data. Such data attributes may be used to determine data quality and correction costs. Low quality data with low correction costs is generally the most beneficial data to correct. Selecting data for correction based on attributes of the data enables data to be corrected before costly errors due to incorrect data occur.

While the present invention has been described in connection with the preferred embodiments of the various figures, it is to be understood that other similar embodiments may be used or modifications and additions may be made to the described embodiment for performing the same function of the present invention without deviating therefrom. For example, while the present invention is described above in connection with selecting low quality data with low correction costs, the present invention may also be used to select high quality data with high correction costs. Furthermore, while the present invention determines selection factors based on data attributes such as, for example, the type, domain, structure, size, and volume of the data, other data attributes may also be considered. Therefore, the present invention should not be limited to any single embodiment, but rather should be construed in breadth and scope in accordance with the appended claims.

I claim:

1. A method for selecting data to be corrected, comprising:
   (a) receiving a plurality of data elements from a first storage device and identifying a pool of data elements from the plurality of data elements;
   (b) selecting a set of random data elements from the pool;
   (c) scoring the random data elements in the set to generate a first score;
   (d) identifying a predetermined number of lowest scoring data elements and a predetermined number of highest data elements;
   (e) removing the lowest scoring data elements from the set;
   (f) selecting data elements from the pool related to the highest scoring data elements in the set;
   (g) scoring the set to determine a current score;
   (h) determining if the current set score is within a predetermined range of the first score; and
   (i) if the current set score is not within a predetermined desired range of the previous set score, then repeating steps (c) through (i) until the current set score is within a predetermined desired range of the previous set score, otherwise identifying the set as data to be corrected and storing the data in a second storage device;
   wherein scoring the data elements in steps (c) and (g) is based on at least one of a type of the data, a domain of the data; a structure of the data; a size of the data, and a volume of the data that comprises the data elements.

2. The method of claim 1, wherein identifying the pool of data elements comprises identifying each data element is identified in a metadata repository.

3. The method of claim 1, wherein the step of selecting a set of random data elements comprises:
   assigning each element an identification number; and
   selecting a set of identification numbers using a random number generator.

4. The method of claim 1, comprising selecting data elements from the pool related to the highest scoring data elements in the set based on at least one of a logical relationship, a physical relationship, a data transformation, and a naming standard relationship.

5. The method of claim 4, wherein the logical relationship comprises a relationship between an entity and an attribute.

6. The method of claim 1, further comprising scoring the set based on the cumulative score of each element in the set.

7. A system for selecting data to be corrected, comprising:
   a processor operative to execute computer executable instruction; and
   memory having stored therein computer executable instructions for performing the following steps:
   (a) receiving a plurality of data elements from a first storage device and identifying a pool of data elements from the plurality of data elements;
   (b) selecting a set of random data elements from the pool;
   (c) scoring the random data elements in the set to generate a first score;
   (d) identifying a predetermined number of lowest scoring data elements and a predetermined number of highest data elements;
   (e) removing the lowest scoring data elements from the set;
   (f) selecting data elements from the pool related to the highest scoring data elements in the set;
   (g) scoring the set to determine a current score;
   (h) determining if the current set score is within a predetermined range of the first score; and
   (i) if the current set score is not within a predetermined desired range of the previous set score, then repeating steps (c) through (i) until the current set score is within a predetermined desired range of the previous set score, otherwise identifying the set as data to be corrected and storing the data in a second storage device;
   wherein the computer executable instructions for performing the scoring of the data elements in steps (c) and (g) are based on at least one of a type of the data, a domain of the data; a structure of the data; a size of the data, and a volume of the data that comprises the data elements.

8. The system of claim 7, further comprising a metadata repository for identifying data elements in the pool.

9. The system of claim 7, further comprising a random number generator for randomly identifying data elements.

10. The system of claim 7, comprising computer executable instructions for performing the step of selecting data elements from the pool related to the highest scoring data elements in the set based on at least one of a logical relationship, a physical relationship, a data transformation, and a naming standard relationship.

11. The system of claim 10, wherein the logical relationship comprises a relationship between an entity and an attribute.

12. The system of claim 7, further comprising computer executable instructions for performing the step of scoring the set based on the cumulative score of each element in the set.

13. The system of claim 7, further comprising an input device operative to receive computer executable instructions.

14. The system of claim 7, further comprising a display device for displaying data.

15. A computer readable medium having stored thereon computer readable instructions for performing the following steps:
   (a) receiving a plurality of data elements from a first storage device and identifying a pool of data elements from the plurality of data elements;
   (b) selecting a set of random data elements from the pool;
   (c) scoring the random data elements in the set to generate a first score;
   (d) identifying a predetermined number of lowest scoring data elements and a predetermined number of highest data elements;

(e) removing the lowest scoring data elements from the set;
(f) selecting data elements from the pool related to the highest scoring data elements in the set;
(g) scoring the set to determine a current score;
(h) determining if the current set score is within a predetermined range of the first score; and
(i) if the current set score is not within a predetermined desired range of the previous set score, then repeating steps (c) through (i) until the current set score is within a predetermined desired range of the previous set score, otherwise identifying the set as data to be corrected and storing the data in a second storage device;
wherein the computer readable instructions for performing the scoring of the data elements in steps (c) and (g) are based on at least one of a type of the data, a domain of the data; a structure of the data; a size of the data, and a volume of the data that comprises the data elements.

16. The computer readable medium of claim 15, wherein the computer readable instructions for performing the step of identifying the pool of data elements comprises computer readable instructions for performing the step of identifying each data element in a metadata repository.

17. The computer readable medium of claim 15, wherein the computer readable instructions for performing the step of selecting a set of random data elements comprise computer readable instructions for performing the following steps:
assigning each element an identification number; and
selecting a set of identification numbers using a random number generator.

18. The computer readable medium of claim 15, comprising computer readable instructions for performing the step of selecting data elements from the pool related to the highest scoring data elements in the set based on at least one of a logical relationship, a physical relationship, a data transformation, and a naming standard relationship.

19. The computer readable medium of claim 18, wherein the logical relationship comprises a relationship between an entity and an attribute.

20. The computer readable medium of claim 15, further comprising computer readable instructions for performing the step of scoring the set based on the cumulative score of each element in the set.

* * * * *